US006596379B2

(12) United States Patent
McGee

(10) Patent No.: US 6,596,379 B2
(45) Date of Patent: Jul. 22, 2003

(54) POLYMERS STABILIZED BY WATER-SOLUBLE, CATIONIC, AMINO-FUNCTIONAL POLYMER, AND PLASTIC FILM COATED WITH SAME

(75) Inventor: Dennis E. McGee, Penfield, NY (US)

(73) Assignee: ExxonMobil Oil Corporation, Fairfax, VA (US)

( * ) Notice: Subject to any disclaimer, the term of this patent is extended or adjusted under 35 U.S.C. 154(b) by 114 days.

(21) Appl. No.: 09/864,518

(22) Filed: May 24, 2001

(65) Prior Publication Data

US 2003/0055149 A1 Mar. 20, 2003

(51) Int. Cl.$^7$ .............................................. B32B 27/30
(52) U.S. Cl. ...................... 428/195; 428/520; 428/522; 524/801; 524/804; 524/812; 503/227
(58) Field of Search .................. 428/195, 520, 428/522; 524/801, 804, 812; 503/227

(56) References Cited

U.S. PATENT DOCUMENTS

| | | | |
|---|---|---|---|
| 2,926,154 A | 2/1960 | Keim ........................ 260/29.2 |
| 3,174,874 A | 3/1965 | Fikentscher et al. ........ 117/155 |
| 3,245,939 A | 4/1966 | Bergmeister et al. ...... 260/29.6 |
| 3,719,629 A | 3/1973 | Martin et al. |
| 4,214,039 A | 7/1980 | Steiner et al. .............. 428/414 |
| 4,223,115 A | 9/1980 | Zalucha et al. ............. 525/455 |
| 4,308,189 A | 12/1981 | Moritani et al. .... 260/29.6 WA |
| 4,439,493 A | 3/1984 | Hein et al. ................... 428/414 |
| 4,483,959 A | 11/1984 | Maslanka et al. ........... 524/457 |
| 4,546,140 A | 10/1985 | Shih ........................... 524/394 |
| 4,632,869 A | 12/1986 | Park et al. ................ 428/315.5 |
| 4,835,206 A | 5/1989 | Farrar et al. ................ 524/457 |
| 5,089,335 A | 2/1992 | Patton et al. ............... 428/341 |
| 5,194,324 A | 3/1993 | Poirier ..................... 428/315.5 |
| 5,254,631 A | 10/1993 | Yamamoto et al. ......... 525/278 |
| 5,380,587 A | 1/1995 | Musclow et al. ........... 428/353 |
| 5,382,473 A | 1/1995 | Musclow et al. ........... 428/353 |
| 5,521,266 A | 5/1996 | Lau |
| 5,662,985 A | 9/1997 | Jensen et al. ................ 428/195 |
| 6,025,059 A | 2/2000 | McGee et al. ............... 428/219 |
| 6,124,396 A | 9/2000 | Hahn et al. ................. 524/801 |
| 6,372,866 B2 * | 4/2002 | Tamazawa et al. ........... 526/75 |

FOREIGN PATENT DOCUMENTS

| | | |
|---|---|---|
| FR | 1275358 | 11/1960 |
| FR | 1377670 | 6/1964 |
| ZA | 970523 | 1/1997 |

* cited by examiner

*Primary Examiner*—D Lawrence Tarazano
(74) *Attorney, Agent, or Firm*—Rick F. James; Keith A. Bell

(57) ABSTRACT

A cationically stabilized emulsion polymer is disclosed which comprises a combination of at least one polymerizable monomer which is uncharged or positively charged in an aqueous solution having a pH between 1 and 8, polymerized in the presence of at least one water-soluble polymer having a number-average molecular weight greater than 5000 which comprises a moiety selected from the group consisting of primary amines, secondary amines, tertiary amines and quaternary ammonium salts. Coating compositions containing the cationically stabilized emulsion polymer and plastic films thus coated are also disclosed.

19 Claims, No Drawings

POLYMERS STABILIZED BY WATER-SOLUBLE, CATIONIC, AMINO-FUNCTIONAL POLYMER, AND PLASTIC FILM COATED WITH SAME

FIELD OF THE INVENTION

The present invention relates to novel cationic polymeric coatings and plastic substrates comprising such coatings, as well as methods for preparing same.

BACKGROUND OF THE INVENTION

Typically, in the production of emulsion polymers by free-radical polymerization, it has been a common practice to use nonionic or anionic materials to stabilize the emulsions. Alternatively, others have used protective colloids like poly(vinyl alcohol) [PVOH], hydroxyethyl cellulose, or derivatives thereof, either singly or in combination, to stabilize aqueous emulsion polymers. These stabilizers produce emulsion particles that are electrically neutral or negatively charged in an aqueous environment.

Commercially produced emulsions that contain positively charged particles (that is, cationic emulsions) are known, but are far fewer in number. U.S. Pat. No. 5,521,266 to Lau discloses the synthesis of cationic emulsions, but requires complexation of water-insoluble monomers with macromolecular carbohydrates (for example, cyclodextrin, cyclodextrin derivative, cycloinulohexose, cycloinuloheptose, cycloinuloctose, calyxarene and cavitand) having a hydrophobic cavity.

U.S. Pat. No. 4,308,189 to Moritani et al. reviews many conventional techniques for producing cationic emulsions using low-molecular-weight cationic emulsifiers such as laurylamine salt, octadecylamine salt, laurylpyridinium chloride, and others that are toxic and subject to stringent regulations. The '189 patent also describes the use of cationic initiators and monomers to create cationic emulsions. Moreover, one can add materials like alkylaminopolyoxyethylene to nonionic and anionic emulsions to render emulsion particles cationic. Furthermore, the '189 patent unfavorably described the potential for using protective colloids made from cationic derivatives of carbohydrates (for example, starch and cellulose) and polyamide-polyamine epichlorohydrin, which according to U.S. Pat. No. 2,926,154 to Keim is the reaction product of epichlorohydrin with polyamides containing the following recurring groups:

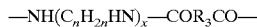

—NH(C$_n$H$_{2n}$HN)$_x$—COR$_3$CO— where n and x are each 2 or more and R$_3$ is the divalent organic radical of a dicarboxylic acid. According to Moritani et al., these materials are poor stabilizers and usually used in combination with nonionic surfactants.

Moritani et al. disclosed an improved class of protective colloids based on cationic group-modified PVOH. While these materials improve fixation affinity for pulp and improved bonding affinity for glass, sand, and concrete, they are not suggested to disclose improved adhesion to plastic film, especially after prolonged exposure to water. Indeed, PVOH and its water-soluble derivatives are prone to swell and release from plastic upon prolonged exposure to water.

U.S. Pat. No. 5,254,631 to Yamamoto et al. discloses cationically electrodepositable, finely divided gelled polymers (that is, internally cross-linked polymer particles that do not coalesce into a film upon drying) having a core-sheath structure obtained by emulsion polymerization. They used water-soluble or water-dispersible cationic resins as a stabilizer in their emulsion-polymerization process. The resin used in their process has, in the molecule, a cationic functional group capable of imparting positive charges and hydrophilicity when neutralized with an acid. They created this water-soluble cationic resin by by reacting a polyphenol with epichlorohydrin to form a polyglycidyl compound compound having a number-average molecular weight between 800 and 2000 and then reacting the epoxy group of the polyglycidyl compound with a cationizing agent.

The polyphenols that they described include bis(4-hydroxyphenyl)-2,2-propane, 4,4'-dihydroxybenzophenone, bis(4-hydroxyphenyl)-1,1-ethane, bis(4-hydroxy-tertbutylphenyl-2,2-propane, bis(2-hydroxynaphthyl) methane, 1,5-dihydroxynaphthalene, bis(2,4-dihydroxyphenyl)methane, tetra(4-hydroxyphenyl)-1,1,2,2-ethane, 4,4'-dihydroxydiphenyl ether, 4,4'-dihydroxydiphenylsulfone, phenol novolac and cresol novolac.

They selected cationizing agents from a list of relatively small amine-containing molecules such as ammonia, hydroxylamine, hydrazine, hydroxyethylhydrazine, N-hydroxyethylimidazoline compound and (1) Primary amines such as methylamine, ethylamine, n- or isopropylamine, monoethanolamine, n- or isopropanolamine and the like.

(2) Secondary amines such as diethylamine, diethanolamine, di-n- or di-isopropanolamine, N-methylethanolamine, N-ethylethanoilamine and the like.

(3) Polyamines such as ethylenediamine, diethylenetriamine, hydroxyethylaminoethylamine, ethylaminoethylamine, methylaminopropylamine, dimethylaminoethylamine, dimethylaminopropylamine and the like.

Therefore the number-average molecular weight of the water-soluble cationic resin will not be significantly more than 2,000 and probably less than about 3,000, especially since Yamamoto et al. teach that content of the cationic group in their water-soluble or water-dispersible cationic resin should be kept as low as possible.

So, there are few processes that yield stable emulsions and none that offer satisfactory performance properties in applications that require film formation on and adhesion to plastic film or adhesion to inks after prolonged exposure to water or solvents like isopropyl alcohol (IPA).

For example, U.S. Pat. No. 4,214,039 to Steiner et al. discloses a cationic polymer as a primer for vinylidene chloride polymers used as coatings for oriented polypropylene packaging films. The primer comprises an epoxy resin composition comprising a) a liquid epoxy resin, e.g., one based on Bisphenol A, preferably emulsified or dissolved in water, and b) a water-soluble, amine-modified acrylic resin. This system, also employed at higher coating weights in U.S. Pat. No. 6,025,059 to McGee et al., has limited shelf stability. Once the ingredients are mixed, the ingredients start to react. The useful pot life of the mixture of the '059 patent is no more than about 3 days. After this, the mixture gels or agglomerates, with precipitation of components. Moreover, undesired blocking can occur at coating weights below 0.25 grams/1000 in$^2$ (g/msi). In addition, ink adhesion problems can occur during printing with black UV-curable screen ink. Finally, the formulation may contain amounts of up to 10–20 wt. % propylene glycol monomethyl ether, which may require certain precautions in handling and use on a commercial scale.

Typically, films prepared for use as label facestock are coated on the printing side with a coating, which enhances ink adhesion. For instance, U.S. Pat. No. 5,380,587 to Musclow et al. discloses a multilayer packaging or label stock film having excellent printability and non-blocking characteristics. The film is first primed and then coated with copolyester coating.

Another ink adhesion enhancing coating is described in U.S. Pat. No. 5,382,473 to Musclow et al. which discloses a multilayer film structure with a prime coating which is the reaction product of acidified aminoethylated vinyl polymer and epoxy resin, top coated with polyester ink base to eliminate blocking.

U.S. Pat. No. 5,662,985 to Jensen et al. discloses a two-side coated label which comprises a polymeric film substrate having on a first surface thereof (A) an adhesive anchor layer and on a second surface thereof (B) an ink base layer, the (A) and (B) layers being selected from the group consisting of: (i) a prime coating having on an external surface a functional coating of an interpolymer of (a) an alpha, beta-monoethylenically unsaturated carboxylic acid; and (b) a neutral monomer ester comprising an alkyl acrylate ester and an alkyl methacrylate ester; and (ii) an iminated polymer; or the (A) adhesive anchor layer being selected from the group consisting of: (iii) a mixture of the functional coating of (i) and the iminated polymer of (ii); (iv) a linear water dissipatable polyester condensation product; and (v) a polyester; or the (B) ink base layer being selected from the group consisting of: (vi) a prime coating having on an external surface a functional coating of an acrylic copolymer; and (vii) a prime coating having on an external surface a functional coating of a styrene copolymer, provided that each of the (A) adhesive anchor layer and the (B) ink base layer is different. This invention offers excellent adhesion to most inks, but lacks resistance to IPA and blushes when the coated film is exposed to hot water.

U.S. Pat. No. 5,089,335 to Patton et al. teaches a cross-linking primer for flexible packaging film which is a copolymer of one or more acrylic comonomers and a cross-linking copolymerizable co-monomer having pendant free hydroxyl groups or groups convertible to free hydroxyl groups. The primer improves adhesion of a poly(vinylidene chloride) [PVdC] moisture- and oxygen-barrier topcoat to the substrate.

One-package aqueous latices containing alkaline-curable self-cross-linking polymers are disclosed in U.S. Pat. No. 4,546,140 to Shih. These cationic polymer emulsions were stabilized by cationic monomers and nonionic surfactants. Shih's invention requires the presence of a salt of an organic carboxylic acid to cure polymerized acrylic esters containing a halohydrin and/or a quaternary ammonium salt. Shih's emulsions do not contain epoxy-functional monomers.

All of the foregoing U.S. patents are incorporated herein by reference.

The development of commercially acceptable coated plastic films for printing applications, e.g., printable labels, is often a compromise between a variety of desired properties. Labels used for beverage containers, or health and beauty containers, should be capable of exposure to severe conditions encountered during manufacturing, transport and storage. Thus printable coatings for plastic films should exhibit hot-water resistance, organic-solvent resistance, e.g., IPA resistance, abrasion resistance, and haze resistance on exposure to hot or cold water. At the same time, the coating should be receptive to ink so as to provide good adhesion of the ink to the coated film immediately after printing. The ink should stay adhered to the coated film after a label is made and applied to a beverage container that is exposed to hot or cold water and subsequent abrasion encountered in mechanized handling.

Non-cross-linked polymer constituents of coatings tend to increase in haze upon exposure to boiling water and may be completely soluble and removed upon exposure to IPA. In addition, after ink is applied and the label exposed to water and abrasion simulating a bottling line, the ink will abrade off the label. Coatings can be made resistant to hot water or chemicals by cross-linking polymers in the coating. However, when cross-linked, coatings are generally less receptive to inks, losing the ability to have good ink adhesion immediately after printing, especially at high printing speeds and low temperature.

It would be highly desirable to provide stable cationic emulsions that allow sufficient design flexibility to create useful coatings for plastic film, such as acrylic or PVdC coatings that offer barrier to aromas, moisture, and oxygen. In particular a coating composition that contains both epoxy and hardener components in a single emulsion with a longer pot life than 3 days, e.g., several weeks. It would also be desirable that such a coating composition exhibits a chemical-resistant, printable surface such that the coated product can be used as a primer for other coatings (cationic, nonionic, or anionic) or as a label that exhibits both acceptable solvent resistance properties and ink adhesion properties, particularly adhesion to UV-curable screen inks. Moreover, it would be desirable that such a coating composition resists blocking at low coating weights, which are economically favorable. Furthermore, it would be desirable to have stable cationic emulsion polymers that could be formulated with additives to enhance adhesion to particular substrates or inks or to impart color, texture (a matte finish or paper-like appearance), anti-static properties, and/or security features.

SUMMARY OF THE INVENTION

In one aspect, the present invention relates to a cationically stabilized emulsion polymer comprising a combination of at least one polymerizable monomer which is uncharged or positively charged in an aqueous solution having a pH between 1 and 8, polymerized in the presence of at least one water-soluble polymer having a number-average molecular weight greater than 5000 which comprises a moiety selected from the group consisting of primary amines, secondary amines, tertiary amines and quaternary ammonium salts, with less than 5 weight percent, preferably less than 1 weight percent, of the monomer units in the water-soluble polymer being comprised of copolymeric units derived from at least one member of the group consisting of carbohydrates, modified carbohydrates, and units having the following formula:

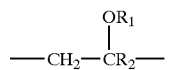

wherein $R_1$ is selected from the group consisting of H, $C_1$ to $C_6$ alkyl, and $C_1$ to $C_6$ acyl and $R_2$ is selected from the group consisting of H, $C_1$ to $C_6$ alkyl, and the reaction product of epichlorohydrin with polyamides containing the following recurring groups:

where n and x are each 2 or more and $R_3$ is a divalent organic radical of a dicarboxylic acid.

In another aspect, the present invention relates to a cationically stabilized emulsion polymer that comprises on a dry basis: i) 30 to 97 wt. % of at least one vinylic, non-acidic monomer which is uncharged or positively charged in an aqueous solution having a pH between 1 and 8; and ii) 3 to 70 wt. % of at least one water-soluble polymeric compound having a number-average molecular weight greater than 5000 which comprises a moiety selected from the group consisting of primary amines, secondary amines, tertiary amines and quaternary ammonium salts.

In still yet another aspect, the present invention relates to a plastic film that comprises i) a plastic substrate and ii) the above-described dried emulsion coating composition on at least one side of said substrate.

In another aspect, the present invention relates to a plastic film which comprises A) a plastic substrate layer, B) a primer layer containing a cationically stabilized emulsion polymer that comprises on a dry basis: i) 30 to 97 wt. % of at least one vinylic, non-acidic monomer which is uncharged or positively charged in an aqueous solution having a pH between 1 and 8; and ii) 3 to 70 wt. % of at least one water-soluble polymeric compound having a number-average molecular weight greater than 5000 which comprises a moiety selected from the group consisting of primary amines, secondary amines, tertiary amines and quaternary ammonium salts; and C) a coating layer which imparts properties to the film which properties are selected from moisture barrier, gas barrier, light barrier, printability, receipt of an image via a process selected from the group consisting of electronic, magnetic, thermal, and photographic processes, generation of an image via a process selected from the group consisting of electronic, magnetic, thermal, and photographic processes, carrying of anti-microbial agents, carrying of colorants, carrying of scents, water absorption, organic solvent absorption, release from pressure-sensitive adhesives, mar resistance, anti-static, conductivity, machinability, sealability, and adhesion.

For present purposes, the term "cationically stabilized emulsion" relates to emulsions containing a polymer having positive charges along its backbone, which are generally associated with negatively charged counterions like $Cl^-$, $Br^-$, $NO_3^-$, $SO_4^{-2}$, $RCO_2^-$ derived from inorganic or organic acids of relatively low molecular weight. However, where such positively charged polymers are mixed with another polymer having anions on the polymer backbone, the two polymers will coagulate. Moreover, if the localized pH around the cationic polymer exceeds 8.0, "kick out" or coagulation of the polymer will occur. Accordingly, it is important that these materials be prepared in an environment that minimizes exposure to anionic polymer.

DETAILED DESCRIPTION OF THE INVENTION

Plastic Substrate

The plastic substrate to be coated can be any thermoplastic material. Preferably, the plastic substrate is produced from a thermoplastic material, such as polyolefins, polyamides, polyesters, and polyethylene terephthalate. Examples of polyolefins to be used include alpha-olefins produced by Ziegler-Natta or metallocene catalysts, such as polyethylene, polypropylene, and copolymers and terpolymers thereof.

Preferably, the plastic substrate layer is a film, since thermoplastic films coated in accordance with preferred embodiments of the invention are particularly suitable for use as printable labels due to their excellent wet-scratch resistance, ink gloss and print image. The films can be clear, translucent, or opaque structures, having one or several layers. Examples of film substrates particularly suitable for use are found in U.S. Pat. Nos. 5,382,473, 5,380,587 and 5,194,324, which are herein incorporated by reference. One preferred cavitated structure is a biaxially oriented cavitated polypropylene/polybutylene terephthalate film, disclosed in U.S. Pat. No. 4,632,869, which is herein incorporated by reference. One preferred clear structure is a biaxally oriented coextruded polyolefin film having a skin layer comprising a random copolymer of ethylene and propylene containing from about 0.5% to 6% ethylene disclosed in U.S. Pat. No. 4,439,493 by Hein et al. incorporated herein by reference.

Total thickness of the plastic films of the present invention can range from 7.5 to 250 microns. Clear label films are generally 25 to 75 microns, with one embodiment being 35 to 55 microns. Cavitated (or opaque) and translucent film substrates for labels can have a thickness from 50 to 250 microns, with one embodiment being 60 to 100 microns. Films used for flexible packaging (clear or opaque) tend to be thinner than labels: 7.5 to 50 microns with 12 to 40 microns being preferred.

Depending upon the intended use, the plastic film can be coated on one or two sides with the coating applied by any means known in the art as a continuous film or as a pattern. In coated areas, the application rate of the coating can be between 0.05 and 5 grams/msi. Economics generally favor thinner coating layers; however, one might choose to use thicker layers of coating to impart stiffness, moisture or gas barrier, seal strength, or optical effects (e.g. color, opacity, or a matte finish) to the plastic film.

Cationically Stabilized Emulsion Polymer

Cationically stabilized emulsion polymer component used in the coating composition of the present invention comprises a combination of at least one polymerizable monomer which is uncharged or positively charged in an aqueous solution having a pH between 1 and 8, polymerized in the presence of at least one water-soluble polymer having a number-average molecular weight greater than 5000, which comprises a moiety selected from the group consisting of primary amines, secondary amines, tertiary amines and quaternary ammonium salts, with less than 5 weight per cent of the monomer units in the water-soluble polymer being comprised of copolymeric units derived from at least one member selected from the group consisting of carbohydrates, modified carbohydrates, polyamide-polyamine epichlorohydrin, and units having the following formula:

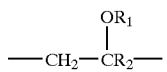

wherein $R_1$ is selected from the group consisting of H, $C_1$ to $C_6$ alkyl, and $C_1$ to $C_6$ acyl and $R_2$ is selected from the group consisting of H, $C_1$ to $C_6$ alkyl, and the reaction product of epichlorohydrin with polyamides containing the following recurring groups:

where n and x are each 2 or more and $R_3$ is a divalent organic radical of a dicarboxylic acid. An emulsion-forming component such as water or a hydrophilic material such as alcohols, glycol ethers, nonionic emulsifiers, or cationic emulsifiers having a number-average molecular weight that is <5000 is added to provide an emulsion which can be applied to a substrate to produce a coated substrate.

On a dry basis, the polymerizable monomer can comprise:

i) 30 to 97 wt. %, preferably 55 to 95 wt. %, more preferably 80 to 93 wt. %, of at least one vinylic, non-acidic monomer which is uncharged or positively charged in an aqueous solution having a pH between 1 and 8; and ii) 3 to 70 wt. %, preferably 5 to 45 wt. %, more preferably 7 to 20 wt. %, of at least one water-soluble polymeric compound having a number-average molecular weight greater than 5000, preferably greater than 7500, say, at least 9000 or even at least 10000, which comprises a moiety selected from the group consisting of primary amines, secondary amines, tertiary amines and quaternary ammonium salts.

The monomer can be selected from the group consisting of acrylic acid ester of $C_1$ to $C_8$ alcohol, methacrylic acid ester of $C_1$ to $C_8$ alcohol, acrylonitrile, methacrylonitrile, acrylamide, methacrylamide, N-substituted acrylamide, N-substituted methacrylamide, N-vinyl lactam, vinyl pyrrole, epoxy-functional vinyl compound, halogenated vinyl compound, vinyl monomer having a vinyl ester of an up to $C_6$ saturated aliphatic monocarboxylic acid, vinyl ether, alkyl vinyl ketone, diester of alpha, beta-unsaturated dicarboxylic acid, butadiene, and styrene.

The $C_1$ to $C_8$ alcohol can be unsubstituted or it may comprise an additional moiety selected from the group consisting of halogen, hydroxyl, amino, aziridino, alkoxy, and epoxy. The epoxy-functional vinyl compound can be selected from the group consisting of 3,4-epoxy-1-butene, and 2-X-3,4-epoxy-1-butene, where X is selected from the group consisting of fluoride, chloride, and bromide.

A preferred water-soluble polymeric compound described in U.S. Pat. No. 3,719,629 to Martin et al., which is incorporated herein by reference, is an acidified aminoethylated interpolymer having pendant amino alkylate groups of the general formula: $CO_2(CHR_1CHR_2NH)_nH$, where $R_1$ and $R_2$ are selected from the group consisting of hydrogen and lower alkyl radicals comprising one to six carbon atoms, where the average value of n ranges from about 1.0 to 2.5.

Self-curing embodiments include those wherein at least one of the monomer(s) is an epoxy-functional monomer; and the water-soluble polymeric compound has a number-average molecular weight greater than 5000, preferably greater than 7500, and comprises a moiety selected from the group consisting of primary amines, secondary amines, and tertiary amines. The epoxy-functional monomer can be selected from the group consisting of glycidyl acrylate and glycidyl methacrylate (GMA). In a preferred embodiment, the self-curing, cationically stabilized emulsion polymer comprises at least one of said monomer(s) which is a nitrogen-containing monomer, e.g., a nitrogen-containing monomer selected from the group consisting of acrylonitrile and methacrylonitrile. Preferably, the water-soluble polymeric compound is present in an amount sufficient to stabilize an emulsion of the polymer and react with the epoxy-functional monomer when the emulsion is dried. The ratio of epoxy equivalents to reactive amine hydrogen equivalents in self-curing polymer can vary widely. However, the preferred ratio is in the range between 1:1 and 1:3, with a ratio between 1:1.5 and 1:2.5 being more preferred.

Coating Composition

The various cationically stabilized emulsion polymers described above are especially suitable for use in a coating composition for plastic film. Such coating composition preferably comprises at least one additive that provides an improved coating. Such an additive can be selected from the group consisting of: coating process-facilitating adjuvant, nonionic wax dispersion, cationic wax dispersion, nonionic slip additive, cationic slip additive, cationic colloidal silica, mineral filler, plastic pigment, adhesion promoter, cross-linking compound, curing catalyst, anti-static additive, and security taggant. Such additives, some of which are further discussed below, are known to those skilled in the art.

Coating process-facilitating adjuvants include defoamers, wetting agents, lubricants, and the like. For example, the coating composition when applied to the substrate layer may not "wet out" uniformly, especially when such materials are applied in very thin layers. As a result, the dry but as yet uncured liquid mixture may retract into droplets or "islands". Also, high-speed application of coatings can generate foam. Volatile additives are generally preferred over non-volatile defoamers and surfactant-like wetting aids. Ethylene glycol monohexyl ether (commercially available as Hexyl Cellosolve™ from Union Carbide) facilitates wetting of the coating on the plastic substrate and helps to control foam. Other alcohols and glycol ethers like Dowanol™ PM made by Dow Chemical Company can serve a similar function. Typically the wet coating formulation can comprise from 0.2% up to about 10% by weight of such volatile processing additives.

Nonionic or cationic wax emulsions can improve block resistance or 30 lower the coefficient of friction. Michemlube 156, produced by Michelman, Inc., is one of many suitable emulsions that are compatible with the cationic emulsion polymers disclosed in this invention. Such materials are generally unnecessary in cross-linked systems, but those skilled in the art know that such materials are important for balancing sealability properties with blocking resistance in coatings that contain little or no cross-linking. Depending upon the application, up to 15% of the dried film can comprise wax.

Slip additives besides wax include synthetic particulates like Nippon Shokubai's Epostar™ poly(methyl methacrylate) spheres that are 1 to 6 microns in diameter dispersed in water or alcohol containing a small amount of nonionic or cationic surfactant to aid dispersion. Equally useful are similarly dispersed non-meltable poly (monoalkylsiloxanes) having a mean particle size of about 0.5 to about 20 microns and a three-dimensional structure of siloxane linkages. Such materials are commercially available from Toshiba Silicone Co., Ltd and they are marketed under the trade name Tospearl™.

Dupont Specialty Chemicals manufactures two grades of colloidal silica: Ludox® CL (average particle size 0.012 micron) and Ludox® CL-P (average particle size 0.022 micron). These materials can lower the coefficient of friction, especially when the flexible packing film or labels are required to move smoothly over heated surfaces. Moreover, these small particulates can help to improve the adhesion of many types of ink. Some applications might require that the dried film contain up to 60% colloidal silica. Other applications require none at all.

Examples of mineral fillers and pigments particularly suitable for use in cationic emulsions are found in U.S. Pat. No. 6,025,059 to McGee et al. Such additives could be expanded to include dyes and pigments to impart color to the coated film.

Useful adhesion promoters can be incorporated into the cationic emulsions to improve anchorage of the coating to certain substrates or to improve adhesion of a topcoat or ink to a substrate that has been coated with the formulated cationic polymer emulsion. Examples of adhesion promoters include, but are not limited to, chelated alkoxy titanates marketed under the trade name "Vertec" are available from Synetix (a division of Imperial Chemical Industries PLC), Silquest® Silanes from Crompton Corporation, or derivatives of phosphinic acid, phosphonic acid, or phosphoric acid as described in U.S. Pat. No. 4,223,115 to Zaruda et al., incorporated herein by reference.

Adhesion of UV-curable coatings and inks to a substrate coated with cationic polymer emulsions of this invention can be improved by including polyfunctional acrylates resulting from the esterification of a polyol with (meth)acrylic acid or polyallyl derivatives as disclosed in a Republic of South Africa Patent Application 970523 (UCB), and incorporated herein by reference. Alternatively, one can accomplish the same purpose with epoxy acrylates formed from the reaction of a glycidyl ether of a member selected from the group consisting of polyethylene glycol and polypropylene glycol; and an unsaturated acid selected from the group consisting of acrylic acid and methacrylic acid. Suitable epoxy acrylates are available from Nagase Chemicals, Ltd., Tatsuno City, Hyogo, Japan under the tradename "Denacol Acrylate" UV or EB Curable Resin. Specific products include "DM-811" (epoxy methacrylate from (poly)ethylene glycol); "DA-911" (epoxy acrylate from (poly)propylene glycol); and "DA-911M" (epoxy acrylate from (poly)propylene glycol). The presence of these non-volatile acrylate components can improve ink adhesion inasmuch as they add reactive double bonds to the coating composition, which can react with double bonds in UV-curable inks or lithographic inks. To hinder premature self-reaction during storage, one can incorporate a suitable stabilizer, e.g., one selected from the group consisting of methyl ether of hydroquinone and hydroquinone with methyl ether of hydroquinone being preferred.

The cationic polymer can be cross-linked with a cross-linking agent added after the polymer synthesis to improve solvent resistance of the coating or to attenuate properties such as hot tack, even if the polymer has functional groups to self-cross-link. For present purposes, IPA resistance can measure solvent resistance. Measurement of IPA resistance of the coated plastic film of the present invention can be carried out by rubbing a 70% IPA soaked swab about 4 by 4.5 centimeters available from Becton-Dickinson in a circular motion 20 times on a coated surface with light pressure using the index finger. Damage or whitening of the coating is then visually assessed after the IPA dries.

The cross-linking agent can be selected from the group consisting of polyfunctional aziridine, epoxy silane, polyfunctional epoxy, polyfunctional isocyanate, urea formaldehyde and melamine formaldehyde. Preferably, the cross-linking agent is selected from the group consisting of epoxy silane, polyfunctional epoxy, and melamine formaldehyde.

In some circumstances, the cross-linking agent is added with a cross-linking catalyst. Such catalysts are known to those skilled in the art and many are listed by Steiner et al. in U.S. Pat. No. 4,214,039 incorporated herein by reference. Preferred amine catalysts include Ancamine® K54 (Tris-2, 4,6-[dimethylaminomethyl]phenol) and Imicure® EMI-24 (2-ethyl-4-methyl-1H-imadazole) manufactured by Air Products and Chemicals, Inc. These amine catalysts are also preferred for the self-curing cationic polymers of this invention. To avoid coagulation of the cationic emulsion, one should dilute these amine catalysts with water to about 1% before adding them to the emulsion. Alternatively, the amine catalysts can be diluted to about 10% solutions that have had the pH lowered to <8 with a mineral acid like HCl or an organic compound like acetic acid. Acid catalysts are preferred for formaldehyde resins, preferably p-toluene sulfonic acid.

Some applications require the coated film to have anti-static properties. Many anti-static additives contain monomeric or polymeric quaternary ammonium salts. These additives are easily compatible with the cationic polymer emulsion of this invention. One such additive is diallyldimethyl ammonium chloride (261 RV manufactured by Calgon Corporation of Naperville, Ill.). Alternatively one can use combinations of nonionic surfactants and low-molecular-weight salts like lithium halides, choline chloride, lithium tetrafluoroborate, and other salts known in the art to impart anti-static properties to the coating.

Inclusion of security taggants in plastic films is useful in identifying counterfeited products or identifying the source of supply in product-liability cases. Any material that is insoluble, stable to conditions of use, and uniquely identifiable could be dispersed into the cationic coatings and applied to a plastic film. Micot Corporation manufactures small multi-colored chips that they market under the trade name Secutag®. These insoluble, heat-resistant particles have particle sizes ranging from 5 to 125 microns. These inert materials are easily dispersed into the cationic emulsions of this invention. These markers are useful, because every customer has a unique color code built into at least four up to ten microscopic layers. Inclusion of a tiny amount of these materials into the coating can uniquely identify the source of the coating or the coated film.

Coated Plastic Film

The above-described coating composition can be applied to a plastic film. Such plastic film can be used in various applications including packaging and labeling. The plastic film comprises i) a plastic substrate and ii) any of the dried emulsion coating compositions of the invention described above. The plastic film of claim may comprise an ink print image on the side of said coating opposite from said plastic substrate. In one aspect, the plastic film comprises A) a plastic substrate layer, B) a primer layer containing a cationically stabilized emulsion polymer that comprises on a dry basis:
  i) 30 to 97 wt. % of at least one vinylic, non-acidic monomer which is uncharged or positively charged in an aqueous solution having a pH between 1 and 8; and
  ii) 3 to 70 wt. % of at least one water-soluble polymeric compound having a number-average molecular weight greater than 5000 which comprises a moiety selected from the group consisting of primary amines, secondary amines, tertiary amines and quaternary ammonium salts; with less than 5 weight percent, preferably less than 1 weight percent, of the monomer units in the water-soluble polymer being comprised of copolymeric units derived from at least one member of the group consisting of carbohydrates, modified carbohydrates, and units having the following formula:

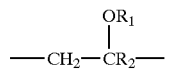

wherein $R_1$ is selected from the group consisting of H, $C_1$ to $C_6$ alkyl, and $C_1$ to $C_6$ acyl and $R_2$ is selected from the group consisting of H, $C_1$ to $C_6$ alkyl, and the reaction product of epichlorohydrin with polyamides containing the following recurring groups:

where n and x are each 2 or more and $R_3$ is a divalent organic radical of a dicarboxylic acid; and C) a coating layer which imparts properties to the film which properties are selected from moisture barrier, gas barrier, light barrier, printability, receipt of an image via a process selected from the group consisting of electronic, magnetic, thermal, and photographic processes, generation of an image via a process selected from the group consisting of electronic, magnetic, thermal, and photographic processes, carrying of antimicrobial agents, carrying of colorants, carrying of scents, water absorption, organic solvent absorption, release from pressure-sensitive adhesives, mar resistance, anti-static, conductivity, machinability, sealability, and adhesion.

The coating layer can be selected from vapor-deposited metals or metal oxides and any polymeric coatings known in the art, and can be in the form selected from at least one of the group consisting of aqueous solvent dispersions, aqueous solvent solutions, organic solvent dispersions and organic solvent solutions. Such coatings can comprise at least one member of the group consisting of acrylic, styrene acrylic, styrene butadiene, acrylonitrile-butadiene-styrene, poly(vinylidene chloride), poly(vinyl chloride), poly(vinyl alcohol), ethylene vinyl alcohol, ethylene-acrylic acid copolymer, polysilicates, silicones, polyurethane, and gelatin. Preferred metals and metal oxides include aluminum and aluminum oxide.

The coating of the present invention can be suitable for receipt of an ink image. The ink print image can be positioned on the side of the coating opposite from the plastic substrate layer. The finished plastic film can have a dry coating weight of at least 0.05 g/msi, with about 0.075 to 0.15 g/msi being preferred for applications requiring a clear film. In applications using filled coatings to create a matte or opaque finish, the finished plastic film can have a dry coating weight of at least 0.05 g/msi and up to 5 g/msi, with 0.5 g/msi up to 3 g/msi being preferred. Barrier and heat-seal coatings can have a dry coating weight of at least 0.3 g/msi and up to 5 g/msi.

Adhesive and Anti-Static Components

In order to provide printable labels, the non-print surface of the coated plastic substrate (i.e., the surface of the substrate opposite the coating) can be coated with various adhesives and have a releasable liner adhered thereon, or with anti-static coatings to improve application performance of coated substrates.

Primer Layer

In another alternative embodiment of the present invention, a primer or functional layer can be applied to the coating side of the plastic substrate prior to coating. Examples of the primer for thermoplastic materials include poly(ethyleneimine), which can be coextruded with or coated on the plastic substrate, and the epoxy coating at a low coating weight following the teaching of U.S. Pat. No. 4,214,039, to Steiner et al. Corona, plasma or flame treating can also be used with or instead of the primer. Functional layers can provide a barrier to gas and water vapor transmission, for example, or other beneficial properties of coatings listed earlier. Materials to be used as the functional layer include, but are not limited to, PVOH and PVdC.

Coating on Side Opposite of the Printable Layer

Coating may optionally be applied on the side opposite side of the substrate film from the printable layer to improve the adhesion of pressure sensitive adhesives or to improve blocking, etc.

Printing

The ink print image can be applied to the coated substrate using any known printing process. Examples include, but are not limited to, gravure, flexographic, lithographic, UV-screen, and intaglio printing processes. Similarly, the choice of inks to be used is variable.

The following non-limiting examples illustrate the preparation of several cationic emulsions and the advantageous use of the above-described coating on plastic films.

EXAMPLES 1 TO 6

These Examples provide products having: i) 30–97% polymerizable monomers and ii) 3–70% Water-soluble Cationic Polymer with $M_n$>5,000, where i) varies between 45 and 93.3%, and $M_w$ of the cationic polymer is ~25,000 ($M_n$=10,000) to 350,000 ($M_n$~200,000). The water-soluble cationic polymers are selected from primary, secondary, tertiary, and/or quaternary amines, as well as acrylics with and without epoxy-functional monomers, with and without nitrogen-containing monomers, and a PVdC with no acrylic monomers save GMA.

EXAMPLE 1

Using a semi-continuous batch process, a latex was prepared by continuously adding and metering 100 grams of methyl acrylate over a period of 35 minutes to a stirred reactor containing 230 grams of water, 250 grams of NK7000 (a 49% solution of an amino-functional styrenated acrylic polymer with a number-average molecular weight of about 10,000 daltons and a weight-average molecular weight of about 25,000 daltons, containing a mixture of primary and secondary amines (manufactured by Nippon Shokubai Co., Ltd., Tokyo, Japan)), and 1 gram of 3% hydrogen peroxide. Before starting the monomer addition, the reactor was heated to 55° C. and swept with nitrogen. When the addition of monomers started, a solution containing 20 grams of water and 0.1 grams ascorbic acid was also started and metered into the reactor over an hour. Thirty minutes after the feeds started, the batch exothermed and the temperature increased to 65° C. The batch remained at 61–69° C. until the monomer feed was completed. Without application of external heat, the batch gradually cooled to 55° C. and 50 grams of water containing 0.1 grams ascorbic acid were added to the reactor followed immediately by the addition of 1 gram of 3% hydrogen peroxide.

The resultant polymer contained 35.5% solids. Of the solid material, approximately 45% was derived from the methyl acrylate polymer and 55% was derived from NK7000. The emulsion was essentially free of coagulum. It had a viscosity of 810 cps. The pH was 2.7, and the intensity-weighted particle size was 0.240 microns (Measured with a Nicomp 370 Submicron Particle Analyzer from Pacific® Scientific). The emulsion was stable for more than six months.

About one gram of this polymer was dried for 30 minutes at 120° C. in an aluminum pan. The dried film was clear, and when water was put in the pan, the water quickly attacked the film making it susceptible to be easily broken into pieces.

EXAMPLE 2

This example shows the use of a water-soluble polymer that contains only quaternary amines as the stabilizer. The quaternary amines cannot react with the epoxy group, so the final polymer remains sensitive to water.

Using a semi-continuous batch process, a latex was prepared by continuously adding and metering 190 grams of monomer (90% of which was methyl acrylate and 10% of which was GMA) over a period of an hour to a stirred reactor containing 385 grams deionized water, 1 gram 3% hydrogen peroxide, 0.4 grams 70% tertiary butyl hydroperoxide, 3 grams Triton X405 (70% active, obtained from Union Carbide), and 25 grams 40% poly(diallyldimethyl ammonium chloride), viz., 261 RV from Calgon Corporation of Naperville, Ill., having a $M_w$ ~200,000 to 350,000 daltons. A feed containing 75 grams water, 0.15 grams ascorbic acid, and 0.6 grams sodium formaldehyde sulfoxylate was also started at the same time as the monomer feed, and it continued for an additional 45 minutes after the introduction of monomer feed. Fifteen minutes after the monomer feed and activator were started, a stabilizer feed containing 100 grams 261 RV and 140 grams water was started and metered in so that this feed finished when the monomers were in.

The feeds were started after sweeping the reactor charge with nitrogen and the batch was heated to 60° C. After about thirty minutes, the batch exothermed to 81° C. and the batch was controlled at between 74 and 81° C. until all the monomers were added.

The resultant polymer was 29.3% solids about 83% of which was the acrylic copolymer and 17% was the polymeric quaternary amine. The finished batch contained no obvious coagulum. It had a viscosity of 1625 centipoise. The pH was 1.8, and the intensity-weighted particle size was about 8 microns.

About one gram of this polymer was dried for 30 minutes at 120° C. in an aluminum pan. The dried film was white, and when water was put in the pan, the water quickly attacked the film making it susceptible to be easily broken into pieces.

EXAMPLE 3

This example shows the use of chemically modified NK7000, which probably contains a mixture of primary, secondary, tertiary, and quaternary amines.

The day before the polymerization, 80 grams NK7000 was mixed with 160 grams water, and 2.8 grams Denacol 192 from Nagase Chemicals, Ltd., Hyogo, Japan. Denacol EX192 is a glycidyl ether of a mixture of $C_{12}$ and $C_{13}$ alcohols of the formula:

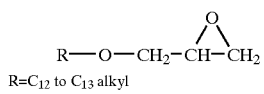

$R=C_{12}$ to $C_{13}$ alkyl

Denacol 192 is sparingly soluble in water, so the mixture was stirred 16 hours to intimately mix the two phases. By morning, only one clear phase remained, indicating that the Denacol 192 had reacted with the NK7000 to create a new water-soluble amino-functional polymer that probably contained a mixture of primary, secondary, tertiary, and quaternary amines.

Using a semi-continuous batch process, a latex was prepared by continuously adding and metering 351 grams of monomer (45% methyl acrylate, 25% n-butyl acrylate, 20% acrylonitrile and 10% GMA) over a period of two hours to a stirred reactor containing 390 grams deionized water, 1 gram 3% hydrogen peroxide, 0.4 grams 70% tertiary butyl hydroperoxide, and 20 grams NK7000. The pH of the reactor charge was adjusted to about 1.9 with 1.3 grams concentrated hydrochloric acid. A feed containing 75 grams water, 0.15 grams ascorbic acid, and 0.6 grams sodium formaldehyde sulfoxylate was also started at time zero, and it continued for an additional hour after adding monomer feed. The monomer feed was started about 5–10 minutes after the activator feed (10% of the monomer was charged to the reactor just before starting the activator feed). Fifteen minutes after the activator feed was started, 242.8 grams of the pre-reacted mixture containing NK7000 modified with Denacol 192 was metered in so that it finished at the same time as the monomer feed.

The activator feed was started after sweeping the reactor charge with nitrogen and the batch was heated to 60° C. and about 35 grams of the monomer mixture were charged to the reactor. The batch quickly exothermed to about 67° C. After that, the batch was controlled at 65–67° C. until the activator feed was finished.

The resultant polymer was 37.9% solids about 87% of which was the acrylic copolymer and 13% was the chemically modified NK7000. The finished batch contained no obvious coagulum and about 0.4 grams wet grit that was removed by filtration through a 115-micron screen. It had a viscosity of 24 centipoise. The pH was 3.0, and the intensity-weighted particle size was about 0.093 microns.

About one gram of this polymer was dried for 30 minutes at 120° C. in an aluminum pan. The dried film was clear, and when the dried film was immersed in water for 16 hours, the film maintained its integrity.

EXAMPLE 4

This example is a PVdC emulsion: Using a semi-continuous batch process, a latex was prepared by continuously adding and metering 270 grams of monomer (80% vinylidene chloride, 10% acrylonitrile, and 10% GMA) over a period of about seven hours to a stirred reactor containing 390 grams deionized water, 1 gram 30% hydrogen peroxide, 1.2 grams concentrated hydrochloric acid, and 20 grams NK7000. A feed containing 50 grams water and 1.0 grams ascorbic acid was added after charging about 10% of the monomer mixture to the reactor and was added for an additional 30 minutes after the monomer feed was added. Fifteen minutes after the activator feed was started, a stabilizer feed containing 80 grams NK7000 and 160 grams water was started and metered in so that this feed finished when the monomers were in.

The feeds were started after sweeping the reactor charge with nitrogen and the batch was heated to 50° C. After about thirty minutes, the monomer feed was started. The batch was controlled at 45 to 50° C. The reactor was fitted with a reflux condenser. The rate of monomer addition was limited by the cooling effect of the refluxing monomer.

The resultant polymer was 34.8% solids about 85% of which was the PVdC copolymer and 15% NK7000. The finished batch contained no obvious coagulum and 1.6 grams of wet grit was removed from the emulsion by passing it through a 115-micron screen. It had a viscosity of 15 centipoise. The pH was 2.1, and the particle size was very broad.

EXAMPLE 5

This polymer does not contain an epoxy-functional monomer.

Using a semi-continuous batch process, a latex was prepared by continuously adding and metering 350 grams of methyl acrylate over a period of about two hours to a stirred reactor containing 550 grams deionized water, 0.12 grams 70% tertiary butyl hydroperoxide, 0.5 grams Triton X405 (70% active), and 100 grams NK7000. A feed containing 50 grams water and 0.1 grams sodium formaldehyde sulfoxylate was started with the monomer feed and it continued for an additional 30 minutes after completing the addition of monomer feed. After all the feeds were added, 0.1 grams sodium formaldehyde sulfoxylate dissolved in 2 mL deionized water was added all at once to the batch, which was allowed to cool slowly to room temperature before filtration through a 115-micron screen.

The feeds were started after sweeping the reactor charge with nitrogen and the batch was heated to 70° C. The batch was controlled at 70 to 76° C. The reactor was fitted with a reflux condenser, but refluxing monomer was not an issue.

The resultant polymer was 38.8% solids about 87.5% of which was the acrylic copolymer and 12.5% was NK7000. The finished batch contained no obvious coagulum and 3 grams of wet grit was removed from the emulsion by filtration. It had a viscosity of 60 centipoise. The pH was 2.5, and the particle size about 0.050 microns.

EXAMPLE 6

This example has a higher ratio of acrylic to NK7000 than the other examples, with 93.3% acrylic:

Using a semi-continuous batch process, a latex was prepared by continuously adding and metering 350 grams of monomer (90% methyl acrylate and 10% GMA) over a period of two hours to a stirred reactor containing 360 grams deionized water, 1 gram 3% hydrogen peroxide, and 10 grams NK7000. The pH of the reactor charge was adjusted with 1.2 grams concentrated hydrochloric acid. A feed containing 50 grams water, 1.0 grams ascorbic acid, and 0.03 grams ferrous sulfate heptahydrate was started at time zero after 10% of the monomer mixture was charged to the reactor, and it continued for an additional hour after the monomer feed went in. The monomer feed was started about 5–10 minutes after the activator feed when the initial exotherm was complete. Fifteen minutes after the activator feed was started, a stabilizer feed containing 40 grams NK7000 and 120 grams water was metered in so that it finished at the same time as the monomer feed.

The activator feed was started after sweeping the reactor charge with nitrogen and the batch was heated to 60° C. and about 35 grams of the monomer mixture were charged to the reactor. The batch quickly exothermed to about 71° C. After that, the batch was controlled at 64–69° C. until the activator feed was finished. When the monomer feed was finished, 0.2 grams 2,2'-azobisisobutyronitrile dissolved in 4 grams methanol were added to the batch to aid in the reduction of free monomer. The batch was held at about 65° C. for an hour. Then it was cooled and filtered through a 115-micron screen.

The resultant polymer was 40.6% solids about 93.3% of which was the acrylic copolymer and 6.7% was NK7000. The finished batch left about 4.5 grams of coagulum on the thermometer and stirrer and about 4 grams wet grit that was removed by filtration through a 115-micron screen. It had a viscosity of 27 centipoise. The pH was 2.0, and the intensity-weighted particle size was about 0.119 microns.

About one gram of this polymer was dried for 30 minutes at 120° C. in an aluminum pan. The dried film was clear, and when the dried film was immersed in water overnight, the film maintained its integrity.

EXAMPLES 7–11

This set of examples shows how the polymer composition affects cross-linking as assessed by resistance to IPA. Examples 7, 8, and 10 concern the effects of GMA on IPA resistance and coating clarity. Too little GMA (<2%) does not permit enough cross-linking to occur to impart IPA resistance. Too much GMA (20%) can make the dried coating hazy because of cross-linking that occurs before the polymer particles have properly coalesced. Examples 7 and 8 also describe a two-stage polymerization process, and Example 9 describes a preferred polymerization process. Example 9 describes the preparation of a polymer having a nitrogen-containing monomer and the preferred amount of GMA, and the preferred ratio of acrylic polymer to cationic stabilizer. Example 11 shows the cross-linking behavior of several different monomer compositions, emulsions of different age, different epoxy/hardener ratios, and different curing conditions. This example also compares the invention to the standard two-part epoxy of U.S. Pat. No. 4,214,039 to Steiner et al.

EXAMPLE 7

This example describes a two-stage monomer addition. The overall level of GMA is 2% of the polymerization monomers, which is not enough to impart IPA resistance.

Using a semi-continuous batch process, a latex was prepared by continuously adding and metering 280 grams of monomer (75% ethyl acrylate and 25% acrylonitrile) over a period of 2.5 hours to a stirred reactor containing 390 grams deionized water, 1 gram 3% hydrogen peroxide, 0.4 grams 70% tertiary butyl hydroperoxide, and 20 grams NK7000. After sweeping the reactor charge with nitrogen and heating the batch to 65° C., 35 grams of the monomer mixture was charged. Immediately a feed containing 75 grams water, 0.15 grams ascorbic acid, and 0.6 grams sodium formaldehyde sulfoxylate was started at time zero, and it continued for 5.25 hours. The monomer feed was started about 5–10 minutes after the activator feed when the initial exotherm was complete. Fifteen minutes after the activator feed was started, a stabilizer feed containing 80 grams NK7000 and 160 grams water was metered in over 3.5 hours, which includes a 30-minute interruption of the feed after about 2.5 hours. At that time the mixture of ethyl acrylate and acrylonitrile was completely added. Thirty minutes were allowed for the residual monomer to react more completely, then a second monomer mixture was added over about 45 minutes that contained 63 grams methyl acrylate and 7 grams GMA. This second feed was used to scavenge the ethyl acrylate (which has an unpleasant odor) and acrylonitrile (which is toxic). The stabilizer feed was resumed when the second monomer feed was started. The batch temperature was controlled at about 65° C. throughout the polymerization. The batch was then cooled and filtered through a 115-micron screen.

The resultant polymer was 35.7% solids about 87.5% of which was the acrylic copolymer (comprising about 60% ethyl acrylate, 20% acrylonitrile, 18% methyl acrylate, and 2% GMA) and 12.5% was NK7000. The finished batch had no observable coagulum and about 0.9 grams wet grit was removed by filtration through a 115-micron screen. It had a viscosity of 18 centipoise. The pH was about 2.5, and the intensity-weighted particle size was about 0.103 microns. The emulsion had a mild odor characteristic of ethyl acrylate.

This material was diluted to 5% solids with water containing 1% Hexyl Cellosolve™ and applied to freshly corona-treated label film (196 Label-Lyte® B2 made by ExxonMobil Films Business) with a 130 Q direct gravure cylinder at 35 feet per minute and dried at 120° C. This yields a dry coating weight of about 0.1 g/msi.

After coating, the film was placed in a 52° C. conditioning room overnight. The next day, the dried film was lightly rubbed with a swab containing 70% IPA (available from Becton Dickinson, catalog #36-6894). The IPA resistance of this coating was poor and all the coating was removed.

EXAMPLE 8

The polymer in this example was prepared using the same process and formulation as described in Example 7, except that the first monomer feed contained 196 grams ethyl acrylate, 56 grams acrylonitrile, and 28 grams GMA.

The resultant polymer was about 36% solids about 87.5% of which was the acrylic copolymer (comprising about 56% ethyl acrylate, 16% acrylonitrile, 18% methyl acrylate, and 10% GMA) and 12.5% was NK7000. Filtration through a 115-micron screen removed 6 grams of fine grit. There was no obvious coagulum. It had a viscosity of 36 cps. The pH was 3.1, and the intensity-weighted particle size was about 0.094 microns. This batch had an odor that was similar to the emulsion made in Example 7.

This material was applied to the same coextruded label film as in Example 7 and conditioned overnight at 52° C. When rubbed with the IPA swab, no coating was removed, and the IPA did not cause the coating to blush. This indicates a higher level of cross-linking occurred in this case than in Example 7. The primary difference in composition was the level of epoxy-containing monomer (10% in this case versus 2% in Example 7).

EXAMPLE 9

This example shows a process for making a self-curing cationically stabilized emulsion polymer having a nitrogen-containing monomer and an epoxy functional monomer.

Using a semi-continuous batch process, a latex was prepared by continuously adding and metering 3510 grams of total monomer (consisting of 1580 grams methyl acrylate, 880 grams butyl acrylate, 700 grams acrylonitrile and 350 grams GMA) over 2.25 hours to a stirred reactor containing 3500 grams deionized water, 200 grams NK7000, 10 grams 30% hydrogen peroxide, and 12 grams 10N hydrochloric acid. A feed containing 500 grams deionized water, 0.3 grams ferrous sulfate heptahydrate, and 10 grams ascorbic acid was metered in over 2.75 hours. This feed was started after the oxygen had been removed from the reactor by a vacuum pump and padded with nitrogen, heated to about 60° C., and 350 grams of the monomer mixture were charged to the jacketed, glass-lined pressure vessel manufactured by Pfaudler. The agitation was set at 150 rpm. The temperature set point was 65° C. About 5–10 minutes after the activator feed was started, the monomer feed was started (at which time the initial exotherm had ended). Fifteen minutes after the activator feed was started, the stabilizer feed (consisting of 800 grams NK7000 and 1400 grams deionized water) was started and metered in over about two hours, ending at about the same time as the monomer feed. Deionized water was used to flush all the feed lines. After the activator feed was in, solution that contained 2 grams 2,2'-azobisisobutyronitrile dissolved in 40 grams methanol was injected into the reactor. The temperature was held at 65° C. for another hour, and then the batch was cooled.

The resultant polymer was 37.9% solids about 87.5% of which was the acrylic copolymer (consisting of 45% methyl acrylate, 25% butyl acrylate, 20% acrylonitrile, and 10% GMA) and 12.5% was NK7000. The finished batch had no observable coagulum and about 1 gram wet grit was removed by filtration through a 115-micron screen. It had a viscosity of 23 centipoise. The pH was about 3.1, and the intensity-weighted particle size was about 0.093 microns. The emulsion had a mild odor characteristic of methyl acrylate.

With this composition the ratio of active amine hydrogens to epoxy groups derived from GMA is about 2:1. The theoretical glass transition temperature is about 8° C. prior to the onset of cross-linking.

EXAMPLE 10

All the polymers in this example were prepared according to the process described in Example 5 with the monomer compositions shown. These materials were diluted to 5% solids with deionized water containing 1% Hexyl Cellosolve™ and applied to freshly corona-treated label film (196 Label-Lyte® B2 made by ExxonMobil Films Business) with a 130 Q direct gravure cylinder at 35 feet per minute and dried at 120° C. This yields a dry coating weight of about 0.1 g/msi. Where shown, the pH of the mixture was increased to between 6.5 and 7.0 with a 1% solution of 2-ethyl-4-methyl-1H-imidazole (Imicure® EMI-24 curing agent from Air Products) before making the final dilution to 5% solids.

This example shows the effect of the level of GMA and amine cross-linking catalyst on the clarity of the coated film. With no cross-linking, the haze is about 2.8%. The addition of the cross-linking catalyst has no significant impact on the haze of the coated film. When the acrylic portion of the cationically stabilized polymer is at 10%, the film clarity is on par with the sample that contained no GMA. Adding the amine catalyst did make a small improvement in the IPA resistance without increasing the haze of the dried film. However, when the acrylic portion of the cationically stabilized polymer contained 20% GMA, the haze of the dried film increased markedly in comparison to the other samples. Adding the amine catalyst did improve the IPA resistance somewhat, but there was also a large jump in the haze of the dried film. This shows that too much GMA in the polymer formulation causes some cross-linking in the emulsion before the film has had a chance to coalesce. This cross-linking does little to promote IPA resistance. The catalyst increased the rate of cross-linking in the wet emulsion and the dried film, which explains the increase in haze and the improvement in IPA resistance. Table 1 below sets out the results.

TABLE 1

| Monomer Composition | Amine Catalyst Added | % Haze | Relative IPA Resistance after 2 days at 52° C. |
|---|---|---|---|
| MA 100% | No | 2.7 | Poor: Coating easily removed |
| MA 100% | Yes | 2.9 | Poor: Coating easily removed |
| MA/GMA 90/10 | No | 2.8 | Poor: Coating easily removed |
| MA/GMA 90/10 | Yes | 2.8 | Fair: Coating still came off, but with more effort |
| MA/GMA 80/20 | No | 7.1 | Poor: Coating easily removed |
| MA/GMA 80/20 | Yes | 9.2 | Fair: Coating removed, but with more effort |

It is noteworthy that samples coated with polymers containing GMA did not become hazier when immersed in hot water (93° C.) for 15 minutes and IPA resistance improved markedly after this treatment.

EXAMPLE 11

All the polymers in this example were prepared using the polymerization process described in Example 9. The polymers were coated on 150 MC550 made by ExxonMobil Films Business that was corona treated at 45 feet per minute (fpm) in line. The coating was applied with 200 Q gravure and dried at 115° C. All except the conventional two-part epoxy primer (Steiner et al. U.S. Pat. No. 4,214,039) were adjusted to pH 6.5–7.0 with 1% Imicure® EMI-24 (in water) and diluted to 6.5% solids. The dried coating weight for all coatings was about 0.1 g/msi.

This example compares the IPA resistance and clarity of cationically stabilized polymers to a standard two-part epoxy primer. This example shows how the age of the emulsion and heat affect cross-linking after the coating has been dried.

All the examples show that cross-linking (IPA resistance) improves with heat aging. Sample #1 (the two-part epoxy control) and #5 (a cationically stabilized polymer with a nitrogen containing monomer) did not require heat to attain excellent IPA resistance. Comparison of #'s 2, 6, and 9 show that as the self-cross-linking cationically stabilized polymers age, the degree of cross-linking (IPA resistance) increases for a given set of curing conditions. These emulsions are all greater than 30% solids. The conventional two-part epoxy will start to precipitate after only three days at 22% solids and must be diluted or used within that time. However, the cationically stabilized self-curing polymers are stable for several weeks.

Only the polymers with nitrogen-containing monomers attained excellent IPA resistance: Note the only difference between polymer #5 and polymer #8 is that polymer #5 contains acrylonitrile (ACN) and polymer #8 contains methyl methacrylate (MMA).

Comparison of polymer #3 (which has a calculated $T_g$ of −12° C.) and polymer #7 (which has a calculated $T_g$ of 29° C.) shows a small improvement in IPA resistance by making the polymer harder.

The ratio of epoxy-functional acrylic monomer to cationic stabilizer can affect the haze of the dried film and the resistance of the coated film to IPA. Comparison of polymers #4 and #5 and #9 and #10 shows that too little cationic stabilizer increases the haze of the coated film. Moreover, having fewer available amine hydrogens to react with the epoxy-functional monomer increases the amount of time or heat required to achieve a given monomer composition's ultimate level of IPA resistance. Because the epoxy-functional acrylate polymer becomes grafted to the polymeric hardener, the interaction of the epoxy-functional acrylate and amine hardener is structurally hindered; therefore, the preferred epoxy/amine hydrogen ratio is closer to 1:2 than it is to 1:1 as it is in a conventional two-part epoxy system in which the epoxy and/or the hardener are relatively low molecular weight. Table 2 below sets out the results.

TABLE 2

| # | Acrylic Composition | Acrylic/ Cationic Stabilizer | Approximate Age of Polymer When Coated | % Haze | Relative IPA Resistance after 7 Days at Ambient | Realtive IPA Resistance after 7 Days at 52° C. |
|---|---|---|---|---|---|---|
| 1 | NA-Standard 2-part Epoxy | NA (Epoxy to amine hydrogen ratio is about 1:1.) | <24 hours | 1.4 | Excellent: No coating removed, no blushing, light scratches | Excellent: No coating removed, no blushing, light scratches |
| 2 | MA/GMA 90/10 | 87.5/12.5 (Epoxy to amine hydrogen ratio is about 1:2.) | 6 weeks | 1.7 | Fair: Coating was removed, but with more effort | Good: No coating removed, but the coating blushed a little |
| 3 | BA/MMA/ GMA 60/30/10 | 87.5/12.5 | 6 weeks | 25.2 | Poor: Coating easily removed | Fair: Coating was removed, but with more effort |
| 4 | MA/BA/ ACN/GMA 45/25/20/10 | 93.3/6.7 (Epoxy to amine hydrogen ratio is about 1:1.) | 5 weeks | 26.7 | Fair: Coating was removed, but with more effort | Excellent: No coating removed, no blushing, only tiny scratches in rubbed area |
| 5 | MA/BA/ ACN/GMA 45/25/ 20/10 | 87.5/12.5 | 4 weeks | 1.6 | Excellent: No coating removed, no blushing, only tiny scratches in rubbed area | Excellent: No coating removed, no blushing, no scratches |
| 6 | MA/GMA 90/10 | 87.5/12.5 | 4 weeks | 1.6 | Fair: Coating was removed, but with more effort | Fair: Coating was removed, but with more effort |
| 7 | MA/MMA/ GMA 70/20/ 10 | 87.5/12.5 | 4 weeks | 1.6 | Fair: Coating was removed, but with more effort | Good: No coating removed, but the coating blushed a little |
| 8 | MA/BA/ MMA/GMA 45/25/ 20/10 | 87.5/12.5 | 3 weeks | 1.6 | Fair: Coating was removed, but with more effort | Good: No coating removed, but the coating blushed a little |
| 9 | MA/GMA 90/10 | 87.5/12.5 | 3 weeks | 1.7 | Fair: Coating was removed, but with more effort | Fair: Coating was removed, but with more effort |
| 10 | MA/GMA 90/10 | 93.3/6.7 | 3 weeks | 3.5 | Poor: Coating easily removed | Fair: Coating was removed, but with more effort |

These examples compare polymers described and coated in Example 11 as primers for PVdC topcoats. For comparison, a primer made according to Steiner et al. (U.S. Pat. No. 4,214,039) was included in the study.

EXAMPLE 12

This example shows that self-curing cationic acrylic polymers can make good primers for barrier coatings.

Polymers prepared and coated as described in Example 11 were overcoated with one of the formulated PVdC emulsions described below. The resultant surface properties, blocking characteristics, and optical properties were comparable to results obtained with a standard two-part epoxy primer. Even primers that were very hazy (see Example 11, #'s 3, 4, and 10) ended up with haze values that were similar to the two-part primer once the PVdC topcoat was applied. Differences in OTR and WVTR values are within experimental error with the exception of the OTR for samples containing Primer #3 from Example 11. The PVdC topcoats imperfectly wet out on this soft primer, which made transmission rates erratic and generally higher than the samples for which the topcoats wet out properly.

| Daran 8500 (49%) | 134 g |
| --- | --- |
| Ammonia | to pH 8.0 |
| M215 Wax (20%) | 7 g |
| Talc (10%) | 3.3 g |
| Deionized water | to total batch weight of 150 g |
| or | |
| PA-297 (60%) | 110 g |
| Ammonia | to pH 8.0 |
| M215 Wax (20%) | 7 g |
| Talc (10%) | 3.3 g |

Deionized water to total batch weight of 150 g

Daran 8500 is a 49% solids, high-barrier PVdC emulsion manufactured by W. R. Grace. Ixan PA-297 is a 60% solids, medium-barrier PVdC manufactured by Solvin. M215 (Michemlube 215) is a 20% solids, carnauba wax emulsion manufactured by Michelman, Inc. The 10% talc dispersion contains Mistron Monomix talc manufactured by Luzenac and dispersion with low shear into water.

As formulated, both PVdC coatings were at 45% solids. The formulated PVdC coatings were applied to pre-primed film (as described in Example 11) with a 130 Q Gravure at 30 fpm and dried at 100° C. The dry coating weight for each PVdC was between 2.2 and 2.5 g/msi. After conditioning as indicated, the samples were tested.

The following results set out below in Table 3 were obtained with formulated Daran 8500 as the topcoat. Samples were conditioned overnight at 52° C. to crystallize the PVdC before testing.

TABLE 3

| Primer # (from Ex. 11) | % Haze | Static COF | Kinetic COF | Blocking (PVdC to PVdC in g/in) | WVTR (g/100 in²/ day at 90% RH and 38° C.) | OTR (cm³/ 100 in²/day at 0% RH and 23° C.) |
| --- | --- | --- | --- | --- | --- | --- |
| 1 (Epoxy) | 1.9 | 0.335 | 0.342 | 1.0 | 0.209 | 0.58 |
| 2 (MA/GMA) | 2.7 | 0.310 | 0.334 | 1.0 | 0.201 | 0.42 |
| 3 (BA/MA/ GMA) | 2.3 | 0.320 | 0.329 | 0.9 | 0.209 | 2.16 |
| 4 (MA/BA/ACN/ GMA) | 2.7 | 0.331 | 0.334 | 1.0 | 0.202 | 0.36 |
| 5 (MA/BA/ACN/ GMA) | 1.8 | 0.347 | 0.366 | 1.0 | 0.205 | 0.46 |
| 6 (MA/GMA) | 1.7 | 0.352 | 0.369 | 1.0 | 0.203 | 0.37 |
| 7 (MA/MMA/ GMA) | 1.6 | 0.339 | 0.358 | 0.9 | 0.205 | 0.36 |
| 8 (MA/BA/ MMA/GMA) | 1.8 | 0.357 | 0.357 | 0.9 | 0.205 | 0.66 |
| 9 (MA/GMA) | 1.7 | 0.353 | 0.354 | 0.9 | 0.195 | 0.64 |
| 10 (MA/GMA) | 1.6 | 0.298 | 0.300 | 0.9 | 0.195 | 0.61 |

The following results below in Table 4 were obtained with formulated Ixan PA-297 as the topcoat. Samples were conditioned overnight at 52° C. to crystallize the PVdC before testing.

TABLE 4

| Primer # (from Ex. 11) | % Haze | Static COF | Kinetic COF | Blocking (PVdC to PVdC in g/in) | WVTR (g/100 in²/ day at 90% RH and 38° C.) | OTR (cm³/ 100 in²/day at 0% RH and 23° C.) |
| --- | --- | --- | --- | --- | --- | --- |
| 1 (Epoxy) | 2.0 | 0.300 | 0.309 | 0.8 | 0.207 | 1.26 |
| 2 (MA/GMA | 2.8 | 0.283 | 0.301 | 0.8 | 0.209 | 1.35 |
| 3 (BA/MA/ GMA) | 2.1 | 0.294 | 0.299 | 0.8 | 0.205 | 1.52 |
| 4 (MA/BA/ACN/ GMA) | 2.9 | 0.271 | 0.290 | 0.8 | 0.215 | 1.35 |
| 5 (MA/BA/ACN/ GMA) | 1.6 | 0.298 | 0.317 | 0.8 | 0.209 | 1.32 |
| 6 (MA/GMA) | 1.7 | 0.289 | 0.290 | 0.9 | 0.221 | 1.35 |
| 7 (MA/MMA/ GMA) | 1.7 | 0.327 | 0.330 | 0.8 | 0.213 | 1.36 |
| 8 (MA/BA/ MMA/GMA) | 1.6 | 0.300 | 0.326 | 0.8 | 0.213 | 1.34 |
| 9 (MA/GMA) | 1.7 | 0.302 | 0.314 | 0.8 | 0.213 | 1.37 |
| 10 (MA/GMA) | 1.6 | 0.263 | 0.273 | 1.0 | 0.207 | 1.21 |

The following tests were used to evaluate surface properties, optical properties, and barrier.

Haze

Haze was measured using a BYK-Gardner XL211 Hazegard® System.

Blocking Test

Blocking was measured by contacting the inside coatings in a laboratory press maintained at 60° C., 750 psi (5,171 kPa) for 1 hour. The force required to separate the films is determined by measuring the force in grams per inch (g/in) needed to pull the films apart in the Instron testing machine.

Coefficient of Friction Test

Static and kinetic COF were measured on a slip/peel tester built by Testing Machines Incorporated (TMI). Two pieces of coated film were mounted in the device with the coated surfaces touching one another. A 200-gram sled was used, and the test was started immediately after placing the sled on the test films (that is, zero dwell time). The machine calculated the COF data from the forces required to slide one surface over the other.

Barrier Testing

Samples for barrier testing were cut with a die and placed in instruments manufactured by Modern Controls (MOCON) for measuring oxygen or moisture barrier. Samples for WVTR were actually tested at 37.8° C., 100% RH. The reported transmission rate was then obtained by multiplying the observed transmission rate by 0.9 to yield the transmission rate for that temperature at 90% RH.

EXAMPLE 13

This example shows that the cationic acrylic emulsions made good primers for sealable coatings. The samples prepared in Example 12 were also tested for sealing characteristics: Hot tack at 104°, 116°, and 127° C., seal strength formed at 127° C., and retained seal strength after immersion in ambient-temperature water for 24 hours. Initial and retained seal strengths and hot tack are comparable to Steiner et al. (U.S. Pat. No. 4,214,039) and superior to values reported by Patton et al. (U.S. Pat. No. 5,089,335): Note that Patton et al., explicitly state in their Example 3 that epoxy-primed films were found to display improved results over the primer of their invention. By being a one-part epoxy system, this invention overcomes their stated disadvantage of a two-part epoxy system. Moreover, the cationically stabilized primer in this invention is effective at a coating weight that is more than 20 times lighter than the nonionic or anionic acrylic primers described in their invention.

The results in Table 5 below were obtained with formulated Daran 8500 as the topcoat. Samples were conditioned overnight at 52° C. to crystallize the PVdC before testing.

TABLE 5

| Primer # (from Ex. 11) | Hot Tack At 104° C. (g/in) | Hot Tack At 116° C. (g/in) | Hot Tack At 127° C. (g/in) | Seal Strength at 127° C. (g/in) | Retained Seal Strength (g/in) |
|---|---|---|---|---|---|
| 1 (Epoxy) | 311 | 311 | 311 | 905T | 335T |
| 2 (MA/GMA) | 311 | 311 | 311 | 925T | 213 |
| 3 (BA/MA/GMA) | 210 | 210 | 210 | 455T | 253 |
| 4 (MA/BA/ACN/GMA) | 311 | 311 | 311 | 815T | 213 |
| 5 (MA/BN/ACN/GMA) | 311 | 311 | 311 | 825T | 390 |
| 6 (MA/GMA) | 311 | 311 | 311 | 785T | 220T |
| 7 (MA/MMA/GMA) | 311 | 311 | 311 | 880T | 248 |
| 8 (MA/BA/MMA/GMA) | 311 | 311 | 311 | 835T | 338T |
| 9 (MA/GMA) | 311 | 311 | 311 | 800T | 230T |
| 10 (MA/GMA) | 311 | 311 | 260 | 870T | 500T |

A "T" indicates that the film sample tore while the bond was being pulled.

The results in Table 6 below were obtained with formulated Ixan PA-297 as the topcoat. Samples were conditioned overnight at 52° C. to crystallize the PVdC before testing.

TABLE 6

| Primer # (from Ex. 11) | Hot Tack At 104° C. (g/in) | Hot Tack At 116° C. (g/in) | Hot Tack At 127° C. (g/in) | Seal Strength at 127° C. (g/in) | Retained Seal Strength (g/in) |
|---|---|---|---|---|---|
| 1 (Epoxy) | 108 | 210 | 210 | 905T | 470T |
| 2 (MA/GMA) | 108 | 210 | 210 | 860T | 260 |
| 3 (BA/MA/GMA) | 159 | 210 | 159 | 710T | 330T |
| 4 (MA/BA/ACN/GMA) | 108 | 210 | 210 | 890T | 225 |
| 5 (MA/BA/ACN/GMA) | 108 | 210 | 159 | 840T | 330T |
| 6 (MA/GMA) | 108 | 210 | 159 | 865T | 205 |
| 7 (MA/MMA/GMA) | 108 | 210 | 159 | 620T | 275T |
| 8 (MA/BA/MMA/GMA) | 108 | 210 | 159 | 660T | 450T |
| 9 (MA/GMA) | 108 | 210 | 159 | 810T | 230 |
| 10 (MA/GMA) | 210 | 260 | 159 | 840T | 550T |

A "T" indicates that the film sample tore while the bond was being pulled. Results are more variable with samples that have been immersed in water, because the seal strength will recover while the sample is being tested, that is, as the sample begins to dry out, the apparent seal strength will improve in some spots but not others. Samples that tear at very low bond values result from uneven drying. "V" tears (caused by a localized tear) diminish the observed bond strength, because they essentially reduce the width of the sample that is being tested.

The following tests were used to evaluate sealability properties.

Hot Tack Test

Hot tack was evaluated to determine whether the samples would run on high-speed packaging equipment. In the hot tack test a film specimen is placed over a spring and bent into a "U" shape with the sealing surfaces placed together. The spring ends are closed and the sealing surfaces are placed into the jaws of a "WRAP-ADE" crimp sealer to make a seal. While the sealing jaws are closed (0.5 seconds at 20 psi) the spring tension is released. The amount of tension (g/in) needed to pull the seals apart is the hot tack value. A sample will pass the test for a given spring if the seal does not open up more than ⅛ inch when the jaws open. Springs used for the test had strengths of 72, 108, 159, 210, 260, and 311 grams/inch. Therefore, a value of "159" means that the hot tack was between 159 and 209 grams/inch. If the actual hot tack strength had an average value of, for example, 205 grams/inch, most samples would pass the 159 gram/inch spring but fail the 210 gram/inch spring. However, given a normal distribution of hot tack values, some samples would pass the test with the 210 gram/inch spring. Therefore, a difference of only one spring value might not be significant.

Crimp Seal Strength Test

Crimp seal strength was evaluated by inserting the test film squarely between the jaws of a "WRAP-ADE" crimp sealer so that the transverse direction of the film was parallel to the jaws. The seal was formed at the indicated temperature, 20 psi pressure, and 0.5 seconds dwell time. After the seal formed, the free ends were each placed in the clamp of a Suter Tester and pulled away from each other using a "T-peel" test. The maximum force required to separate the seals was recorded.

These examples show the utility of the self-curing cationic polymers as primers for printing ink. These materials are contrasted with primers described by Steiner et al. (U.S. Pat. No. 4,214,039) and McGee et al. (U.S. Pat. No. 6,025, 059). Though data do not appear in these examples, the inventions of Musclow et al. (U.S. Pat. Nos. 5,380,587 and 5,382,473), show adhesion behavior with black UV-curable inks that is similar to the examples cited for McGee et al. in the '059 patent.

EXAMPLE 14

Polymer #5 from Example 11 was used to create samples for printing tests with UV-curable ink. Black ink was chosen, because it is one of the most difficult inks to cure properly. The base film was a cavitated opaque film (Label-Lyte® 160LL302 made by the ExxonMobil Films Business). Two different coatings were also used: One was clear and the other contained clay to yield a matte appearance.

The following ingredients were mixed in a Waring blender for two minutes at low speed and three minutes at high speed to disperse the clay:

| Polymer emulsion #5 (Example 11) | 200 grams |
|---|---|
| Lithosperse 7015HS (from Huber) | 75 grams |

By the end of the process, the viscosity of the dispersion was 210 cps at 54.5% solids. The ratio of clay to polymer (on a dry weight basis) was about 1 to 1. A portion of this dispersion was used to make the following matte coating formulation (Example 14-1):

| | |
|---|---|
| Lithosperse 7015HS dispersion | 83 grams |
| Deionized water | 50 grams |
| 1% Imicure ® 24 | 17 grams (to pH 5.5) |
| Hexyl Cellosolve ™ | 0.8 grams |

This formulation contains about 30% solids and 2% organic solvent: ~1.5% propylene glycol monomethyl ether (PGME, from the NK7000 using to make polymer emulsion #5 in Example 11) and 0.5% Hexyl Cellosolve™. Because of the PGME in NK7000, matte coatings prepared according to McGee et al. (U.S. Pat. No. 6,025,059) will typically contain >10% solvent.

This coating was applied with a 130 Q gravure to the print face of 160LL302 after in-line corona treatment. The coatings were applied at 35 fpm on a 6-inch wide lab coater and dried at 121° C. On both substrates, the dry coating weight of the matte coating was about 0.95 g/msi.

A clear and glossy coating was prepared from the following mixture (Example 14-2):

| | |
|---|---|
| Polymer emulsion #5 (Example 11) | 20 g |
| Water | 115 g |
| 1% Imicure ® EMI-24 | 15 g (to pH 5.5) |

This coating was applied to the print face of 160LL302 using the same procedure as the matte coating. It was not necessary to add Hexyl Cellosolve™ to this coating. On both substrates, the dry coating weight of the clear coating was about 0.12 g/msi.

Once coated, one set of samples was kept at ambient temperature for at least three days before testing. Another set of samples was conditioned for three days at 52° C. plus, in some cases, additional ambient aging thereafter.

Table 7 below shows the results for ink-adhesion tests with Norcote black UV-curable screen ink. The plate holding the conditioned sample was inked at 60–65° F. and cured with three passes under the UV lamp (100 feet/min on a UV irradiator built by Fusion Systems, Inc.). Initial ink adhesion was measured within ten minutes of applying ink to the coated plastic film, which had been conditioned as indicated. The ink was scored by BYK-Gardner Cross-Cut-Tester, which is an instrument comprising eleven blades arranged to cut a cross-hatched pattern down to the substrate layer after perpendicular cuts. The ink on the surface of the coated film is then picked off using three rapid pulls of 610 Scotch® 600 tape available from 3M of Minneapolis, Minn. Ink adhesion is then estimated as a percentage of print remaining:

TABLE 7

| Coating | Conditioning | % Initial Ink Adhesion | % Ink Adhesion after 24 hrs Immersion |
|---|---|---|---|
| Example 14-1 Filled | Ambient | 100 | 75 |
| Example 14-1 Filled | Heat | 100 | 98 |
| Example 14-2 No Filler | Ambient | 100 | 100 |
| Example 14-2 No Filler | Heat | 100 | 99 |
| Filled samples made according to McGee et al. (U.S. Pat. No. 6,025,059) | Ambient | <25 | Not Tested |

TABLE 7-continued

| Coating | Conditioning | % Initial Ink Adhesion | % Ink Adhesion after 24 hrs Immersion |
|---|---|---|---|
| Filled samples made according to McGee et al. (U.S. Pat. No. 6,025,059) | Heat | <25 | Not Tested |
| Clear samples made according to McGee et al. (U.S. Pat. No. 6,025,059) | Ambient | <10 | <70 |
| Clear samples made according to McGee et al. (U.S. Pat. No. 6,025,059) | Heat | <10 | <70 |

In comparison to the matte samples made per U.S. Pat. No. 6,025,059, the instant invention shows much better initial adhesion to black UV-cured screen ink. The UV-ink adhesion to the coatings described in U.S. Pat. No. 6,025,059 does improve with time, which is why the values increase, even after 24 hours immersion in water. However, printers like to know immediately whether or not the ink is adhering properly so that they can maintain consistent quality.

EXAMPLE 15

The coatings from Example 14 were applied using the same methods to Label-Lyte® 196 LL B2 (clear) and 160LL302 (opaque) film. After conditioning the samples in the same way as Example 14, Flint OS Labelyte Process Ink was applied to the samples using a Thwing-Albert "Quick-peek"® lithographic hand proofer. Another three days was allowed for the lithographic ink to cure at room temperature. All samples, including those prepared according to U.S. Pat. No. 6,025,059, yielded 100% adhesion in a cross-hatch test.

Table 8 below shows the results for wet-scratch resistance after immersion in deionized water overnight. McGee et al. (U.S. Pat. No. 6,025,059) describe the test apparatus and procedure:

TABLE 8

| Coating | Base Film | Conditioning | # Strokes Passed | Relative Resistance to Scratching with a Rounded Glass Rod (0–5, 5 best) |
|---|---|---|---|---|
| Example 14-2 (No Filler) | Clear | Ambient | 400 | 5 |
| Example 14-2 (No Filler) | Clear | Heat | 1000 | 5 |
| Example 14-1 (Filled) | Clear | Ambient | 7 | 2 |
| Example 14-1 (Filled) | Clear | Heat | 400 1000* | 5 |
| Clear samples made according to McGee et al. (U.S. Pat. No. 6,025,059) | Clear | Ambient | 164 | Not Tested |
| Example 14-1 (Filled) | Opaque | Ambient | >1000 | |
| Example 14-1 (Filled) | Opaque | Heat | >1000 | |
| Example 14-2 (No Filler) | Opaque | Ambient | >1000 | 5 |
| Example 14-2 (No Filler) | Opaque | Heat | >1000 | 5 |
| Filled samples made according to McGee et al. (U.S. Pat. No. 6,025,059) | Opaque | Ambient | >1000 | 5 |

TABLE 8-continued

| Coating | Base Film | Conditioning | # Strokes Passed | Relative Resistance to Scratching with a Rounded Glass Rod (0–5, 5 best) |
|---|---|---|---|---|

*Replicate tests of clear film coated with the filled coating from Example 14-1 gave very different results. This often happens in the wet-scratch test. A piece of debris can lodge under the edge of the "coin" in the sled, and it makes the test more severe.

These results show that the self-curing cationic polymers can be used to make lithographically printed labels that have excellent wet-scratch resistance. As is usually the case, the cavitated base sheet offers better performance in the wet-scratch test, because it is somewhat compressible. However, even on the clear base sheet, the results are generally impressive.

To get good wet-scratch resistance, complete curing of the coating is more important on clear base film than on the cavitated base film. Moreover, the clear base films lack formulation: No large particulates (per U.S. Pat. No. 6,025,059) were included in the formulation. So, conceivably, even better results could be obtained if one applied what was taught about formulating coatings for wet-scratch resistance by McGee et al. The excellent results with the clay-filled cationic polymer distinguish the coating from the instant invention from a water-resistant acrylic polymer described by McGee et al. (Example 2 of U.S. Pat. No. 6,025,059), which offered good wet-scratch resistance when the coating formulation did not contain filler, but lost wet-scratch resistance when particulates were added to the coating formulation. Moreover, adjustments in the type or amount of the cross-linking catalyst could also improve results. Furthermore, one skilled in the art could adjust comonomer ratios and $T_g$ values of the self-curing polymer to optimize the coated film for selected applications.

What is claimed is:

1. A cationically stabilized emulsion polymer comprising at least one polymerizable monomer which is uncharged or positively charged in an aqueous solution having a pH between 1 and 8, polymerized in the presence of at least one water-soluble polymer having a number-average molecular weight greater than 5000 which comprises a moiety selected from the group consisting of primary amines, secondary amines, tertiary amines and quaternary ammonium salts, with less than 5 weight percent of the monomer units in the water-soluble polymer being comprised of copolymeric units derived from at least one member selected from the group consisting of carbohydrates, modified carbohydrates, polyamide-polyamine epichlorohydrin, and units having the following formula:

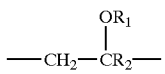

wherein $R_1$ is selected from the group consisting of H, $C_1$ to $C_6$ alkyl, and $C_1$ to $C_6$ acyl and $R_2$ is selected from the group consisting of H, $C_1$ to $C_6$ alkyl, and the reaction product of epichlorohydrin with polyamides containing the following recurring groups:

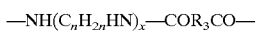

where n and x are each 2 or more and $R_3$ is a divalent organic radical of a dicarboxylic acid.

2. The cationically stabilized emulsion polymer of claim 1, with less than 1 weight per cent of the monomer units in the water-soluble polymer being comprised of copolymeric units derived from at least one member selected from the group consisting of carbohydrates, modified carbohydrates, polyamide-polyamine epichlorohydrin, and units having the following formula:

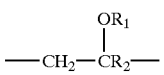

wherein $R_1$ is selected from the group consisting of H, $C_1$ to $C_6$ alkyl, and $C_1$ to $C_6$ acyl and $R_2$ is selected from the group consisting of H, $C_1$ to $C_6$ alkyl, and the reaction product of epichlorohydrin with polyamides containing the following recurring groups:

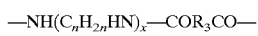

where n and x are each 2 or more and $R_3$ is a divalent organic radical of a dicarboxylic acid.

3. A cationically stabilized emulsion polymer that comprises on a dry basis:
   i) 30 to 97 wt. % of at least one vinylic, non-acidic monomer which is uncharged or positively charged in an aqueous solution having a pH between 1 and 8; and
   ii) 3 to 70 wt. % of at least one water-soluble polymeric compound having a number-average molecular weight greater than 5000 which comprises a moiety selected from the group consisting of primary amines, secondary amines, tertiary amines and quaternary ammonium salts.

4. The cationically stabilized emulsion polymer of claim 3 that comprises on a dry basis:
   i) 80 to 93 wt. %, of said at least one vinylic, non-acidic monomer; and
   ii) 7 to 20 wt. %, of said at least one water-soluble polymeric compound having a number-average molecular weight greater than 7500.

5. The cationically stabilized emulsion polymer of claim 3 that is self-curing, wherein
   at least one of said monomer(s) is an epoxy-functional monomer; and
   said water-soluble polymeric compound has a number-average molecular weight greater than 7500 and comprises a moiety selected from the group consisting of primary amines, secondary amines, and tertiary amines.

6. The self-curing, cationically stabilized emulsion polymer of claim 5 wherein at least one of said monomer(s) is a nitrogen-containing monomer.

7. The self-curing, cationically stabilized emulsion polymer of claim 6 wherein at least one of said monomer(s) is an epoxy-functional monomer selected from the group consisting of glycidyl acrylate and glycidyl methacrylate; and
   said nitrogen-containing monomer is selected from the group consisting of acrylonitrile and methacrylonitrile.

8. The emulsion polymer of claim 3 wherein
   i) said monomer is selected from the group consisting of acrylic acid ester of $C_1$ to $C_8$ alcohol, methacrylic acid ester of $C_1$ to $C_8$ alcohol, acrylonitrile, methacrylonitrile, acrylamide, methacrylamide, N-substituted acrylamide, N-substituted methacrylamide, N-vinyl lactam, vinyl pyrrole, epoxy-functional vinyl compound, halogenated vinyl compound, vinyl monomer having a vinyl ester of an up to $C_6$ saturated aliphatic monocarboxylic acid, vinyl ether, alkyl vinyl ketone, diester of alpha, beta-unsaturated dicarboxylic acid, butadiene, and styrene; and ii) said water-soluble polymeric compound has a number-average molecular weight greater than 7500.

9. The emulsion polymer of claim 8 wherein said $C_1$ to $C_8$ alcohol comprises an additional moiety selected from the group consisting of halogen, hydroxyl, amino, aziridino, alkoxy, and epoxy; and said epoxy-functional vinyl compound is selected from the group consisting of 3,4-epoxy-1-butene, and 2-X-3,4-epoxy-1-butene, where X is selected from the group consisting of fluoride, chloride, and bromide; and said water-soluble polymeric compound has a number-average molecular weight greater than 7500 and is an acidified aminoethylated interpolymer having pendant amino alkylate groups of the general formula $CO_2(CHR_1CHR_2NH)_nH$, where $R_1$ and $R_2$ are selected from the group consisting of hydrogen and lower alkyl radicals comprising one to six carbon atoms and the average value of n ranges from about 1.0 to 2.5.

10. The emulsion polymer of claim 5 wherein said water soluble polymeric compound is present in an amount sufficient to stabilize an emulsion of said polymer and react with said epoxy-functional monomer when said emulsion is dried.

11. A coating composition for plastic film which composition contains a cationically stabilized emulsion polymer that comprises on a dry basis:

i) 30 to 97 wt. % of at least one vinylic, non-acidic monomer which is uncharged or positively charged in an aqueous solution having a pH between 1 and 8; and ii) 3 to 70 wt. % of at least one water-soluble polymeric compound having a number-average molecular weight greater than 5000 which comprises a moiety selected from the group consisting of primary amines, secondary amines, tertiary amines and quaternary ammonium salts.

12. The coating composition of claim 11 wherein said cationically stabilized emulsion polymer comprises on a dry basis:

i) 80 to 93 wt. %, of said at least one vinylic, non-acidic monomer; and ii) 7 to 20 wt. %, of said at least one water-soluble polymeric compound having a number-average molecular weight greater than 7500.

13. The coating composition of claim 11 wherein said cationically stabilized emulsion polymer is self-curing and at least one of said monomer(s) is an epoxy-functional monomer selected from the group consisting of glycidyl acrylate and glycidyl methacrylate; and said water-soluble polymeric compound comprises nitrogen-containing monomer selected from the group consisting of acrylonitrile and methacrylonitrile.

14. The coating composition of claim 11 which further comprises at least one element selected from the group consisting of: coating process-facilitating adjuvant, nonionic wax dispersion, cationic wax dispersion, nonionic slip additive, cationic slip additive, cationic colloidal silica, mineral filler, plastic pigment, adhesion promoter, cross-linking compound, curing catalyst, anti-static additive, and security taggant.

15. The coating composition of claim 13 which further comprises at least one element selected from the group consisting of: coating process-facilitating adjuvant, nonionic wax dispersion, cationic wax dispersion, nonionic slip additive, cationic slip additive, cationic colloidal silica, mineral filler, plastic pigment, adhesion promoter, cross-linking compound, curing catalyst, anti-static additive, and security taggant.

16. A plastic film which comprises i) a plastic substrate and ii) the dried emulsion coating composition of claim 9 on at least one side of said substrate.

17. The plastic film of claim 16 which further comprises an ink print image on the side of said coating opposite from said plastic substrate.

18. A plastic film which comprises

A) a plastic substrate layer,

B) a primer layer containing a cationically stabilized emulsion polymer that comprises on a dry basis:

i) 30 to 97 wt. % of at least one vinylic, non-acidic monomer which is uncharged or positively charged in an aqueous solution having a pH between 1 and 8; and ii) 3 to 70 wt. % of at least one water-soluble polymeric compound having a number-average molecular weight greater than 5000 which comprises a moiety selected from the group consisting of primary amines, secondary amines, tertiary amines and quaternary ammonium salts; and C) a coating layer which imparts properties to the film which properties are selected from moisture barrier, gas barrier, light barrier, printability, receipt of an image via a process selected from the group consisting of electronic, magnetic, thermal, and photographic processes, generation of an image via a process selected from the group consisting of electronic, magnetic, thermal, and photographic processes, carrying of anti-microbial agents, carrying of colorants, carrying of scents, water absorption, organic solvent absorption, release from pressure-sensitive adhesives, mar resistance, anti-static, conductivity, machinability, sealability, and adhesion.

19. The plastic film of claim 18 wherein said coating layer is selected from at least one member of the group consisting of metal, metal oxides, acrylic, styrene acrylic, styrene butadiene, acrylonitrile-butadiene-styrene, poly(vinylidene chloride), poly(vinyl chloride), poly(vinyl alcohol), ethylene vinyl alcohol, ethylene-acrylic acid copolymer, polysilicates, silicones, polyurethane, and gelatin.

* * * * *